(12) United States Patent
Kim

(10) Patent No.: US 6,959,193 B1
(45) Date of Patent: Oct. 25, 2005

(54) METHOD FOR TRANSMITTING SHORT MESSAGE TO CALLED SUBSCRIBERS

(75) Inventor: Roe-Kwan Kim, Yongin-shi (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/132,351

(22) Filed: Aug. 12, 1998

(30) Foreign Application Priority Data

Aug. 12, 1997 (KR) .............................. 1997/38430

(51) Int. Cl.⁷ ............................................. H04Q 7/20
(52) U.S. Cl. .................. 455/466; 455/566; 455/414.1; 455/550.1
(58) Field of Search ............................... 455/466, 433, 455/435, 518, 519, 520, 514, 412, 566

(56) References Cited

U.S. PATENT DOCUMENTS

| | | | |
|---|---|---|---|
| 5,797,094 A | * | 8/1998 | Houde et al. ............... 455/412 |
| 5,878,351 A | * | 3/1999 | Alanara et al. ............. 455/466 |
| 5,987,323 A | * | 11/1999 | Huotari ...................... 455/433 |
| 6,026,296 A | * | 2/2000 | Sanders, III et al. ....... 455/426 |
| 6,044,275 A | * | 3/2000 | Boltz et al. ................. 455/466 |
| 6,289,223 B1 | * | 9/2001 | Mukherjee et al. ......... 455/466 |

* cited by examiner

*Primary Examiner*—Temica Beamer
(74) *Attorney, Agent, or Firm*—Dilworth & Barrese LLP

(57) ABSTRACT

A method for transmitting a short message to a plurality of subscribers in a mobile communication system. Upon detecting the selection of a short message service menu, a mobile communication terminal transmits short message information including a group identifier and a short message. A short message service center detects the group identifier from the short message information, reads subscriber numbers corresponding to the group identifier from its memory, and simultaneously transmits the short message to the called subscriber numbers.

4 Claims, 8 Drawing Sheets

METHOD FOR TRANSMITTING SHORT MESSAGE TO CALLED SUBSCRIBERS

BACKGROUND

1. Technical Field

The present application relates generally to a method for transmitting short messages in a mobile communication system and, in particular, to a method for simultaneously transmitting a short message to a plurality of called subscribers in a GSM (Global System for Mobile Communication) system.

2. Description of the Related Art

A GSM system is a European cellular mobile telephone system in which traffic and signaling information is transmitted as a digital signal in TDMA (Time Division Multiple Access) format. In general, the signaling and traffic information transmitted between a base transceiver station and a GSM terminal has a burst form of 156.25 bits. Particularly, the data burst of the traffic channel includes 3 start bits, 58 message bits, 26 trailing sequence bits, 58 new message bits, and 3 stop bits. In addition, a guard space exists between successive bursts to distinguish between them, making the total length of a burst equal to 156.26 bits (with a burst time of 0.577 ms). Data bursts of other channels have 8 respective frames which are sequentially positioned on a radio channel frequency. These data bursts include compressed digital traffic information, voice information and character information.

Referring now to FIG. 1, a block diagram illustrates a GSM system in which the present method for transmitting short messages can be implemented. A home location register (HLR) 160 contains data for each of a plurality of mobile subscribers such as a home location of each subscriber and an address of a service center in which a short message for a GSM terminal is stored. The address of the service center is deleted after the short message is transmitted. A visitor location register (VLR) 150 includes data such as an actual or latest known location of a subscriber, an ON/OFF state of a GSM terminal and a secret number. A mobile switching center (MSC) 100 is connected to another MSC 200, a public switched telephone network (PSTN), an integrated services digital network (ISDN), and a short message service center 180. A first base station subsystem (BSS) 110 includes a base station controller (BSC) 112 and a plurality of base transceiver stations (BTSs) 114 and 116. A second base station subsystem (BSS) 120 includes a base station controller (BSC) 122 and a plurality of base transceiver stations (BTSs) 124 and 126. The BSCs 112 and 122 are connected to the MSC 100 and to at least one BTS (e.g., one of the BTSs 114, 116, 124, and 126). In addition, the BTSs 114 and 124 control the transmission of a message between a corresponding one of GSM terminals 10, 20, 30 and 40 and the MSC 100, and forms a radio link to transmit voice and data signals.

A subscriber authenticator 140, operatively coupled to the MSC 100, confirms an authentication number (or "secret number") of a subscriber in order to prevent other mobile subscribers from fraudulently using the identification of another subscriber. The short message service center 180 stores data such as short messages and (as explained in further detail below) a group identifier and a plurality of addresses associated with the group identifier. The telephone numbers of called subscribers are stored in these addresses. If a short message cannot be transmitted to the called subscriber number (i.e., the terminal of the called subscriber is busy or the called subscriber does not answer a call), the short message service center 180 repeatedly attempts to transmit the short message by a preset number of times. Short message service gateways 170 and 190 connect MSCs 100 and 200, respectively, to the short message service center 180.

Referring now to FIG. 2, a block diagram illustrates a GSM terminal (e.g., the GSM terminal 10 of FIG. 1) in which the present method for transmitting a short message can be implemented. A controller 1 controls the overall operation of the GSM terminal. For example, the controller 1 causes the GSM terminal to generate short message group registration information for transmitting a short message during a "short message group transmission mode" (as explained in further detail below). A memory 2 stores various programs that are used by the controller 1 for performing short message group transmission and stores data generated during the execution of these programs. A key entry unit 3 has a plurality of numeric keys and function keys and generates key data. A display unit 4 displays the key data generated from the key entry unit 3, and displays the operating status of the GSM terminal. An audio circuit 6 converts an audio signal received through a microphone MIC, as well as data received from the controller 1, into an intermediate frequency signal. Further, the audio circuit 6 processes an intermediate frequency signal received from an RF circuit 5, and supplies processed data to the controller 1 and a processed audio signal to a speaker SP. The radio frequency (RF) circuit 5 demodulates an RF signal received through an antenna AT into an intermediate frequency signal. Moreover, the RF circuit 5 modulates an intermediate frequency signal received from the audio circuit 6 into an RF signal and transmits the RF signal through the antenna AT.

A conventional short message transmission operation will now be discussed with reference to FIGS. 1 and 2. If a menu key on the key entry unit 3 of the GSM terminal (e.g., GSM terminal 10) is selected, the controller 1 causes the display unit 4 to display a plurality of menus. If a short message service menu is selected among the displayed menus, the controller 1 instructs the calling subscriber to sequentially input a short message service center number, a short message, and a destination address (i.e., a called subscriber). Conventionally, only one destination address can be input. Once the short message service center number, short message and destination address are input, the controller 1 determines if a transmit key (from the key entry unit 3) is selected. If the transmit key is selected, the controller 1 transmits the short message information (i.e., the service center number, the short message and the destination address) through the RF circuit 5 in the prescribed data burst format.

Referring again to FIG. 1, the BTS 114, for example, receives the short message information transmitted from the GSM terminal 10 and then transmits the information to the BSC 112. The BSC 112 then transmits the short message information to the MSC 100. The MSC 100 detects the called subscriber number included in the short message information and determines if the called subscriber number is a registered subscriber number. If the called number is a registered subscriber number, the MSC 100 will detect the service center number (i.e., the service center address) from the short message information and the MSC 100 is then switched to the short message service center 180. The service center address is temporarily stored in the HLR 160. The short message information is matched through the short message service gateway 170 and transmitted to the short message service center 180. The short message service center 180 stores the short message information and detects the destination address. The short message service center 180 then transmits the short message to the destination address via the MSC 100. If the destination address is the GSM terminal 40, for example, the short message service center 180 will transmit the short message to the GSM terminal 40. If the GSM terminal 40 is busy or the call is not answered, the short message service center 180 repeatedly attempts to transmit the short message by a preset number of times.

As demonstrated above, the short message is transmitted to a particular destination terminal by point-to-point links. Moreover, when the calling subscriber wants to transmit a short message to a plurality of terminals using the conventional method discussed above, the short message must be transmitted to each of the terminals one by one (i.e., only one destination address can be designated via the GSM terminal for each set of short message information transmitted to, and processed by, the corresponding MSC).

SUMMARY OF THE INVENTION

The present application is directed to a method for simultaneously transmitting a short message to a plurality of GSM subscribers (i.e., mobile terminals). In one aspect, in a mobile communication system having a plurality of base station subsystems for demodulating signals received from a plurality of corresponding mobile communication terminals and a mobile switching center, operatively connected to the plurality of base station subsystems, for detecting a short message service center number from the demodulated signals and for switching to a corresponding short message service center through a gateway, the short message service center having a memory, a method for transmitting a short message to a plurality of subscribers, comprising the steps of:

transmitting short message information from one of the mobile communication terminals, the short message information including a group identifier and a short message;

detecting, by the short message service center, the group identifier from the short message information; and simultaneously transmitting said short message to subscriber numbers associated with said detected group identifier.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

In the following description of preferred embodiments, specific details are set forth to provide a more thorough understanding of the present invention. It is to be understood, however, that a detailed description of related functions or constructions which are known by those of ordinary skill in the art will not be provided where such description would obscure the subject matter of the present invention.

Figure 3A:
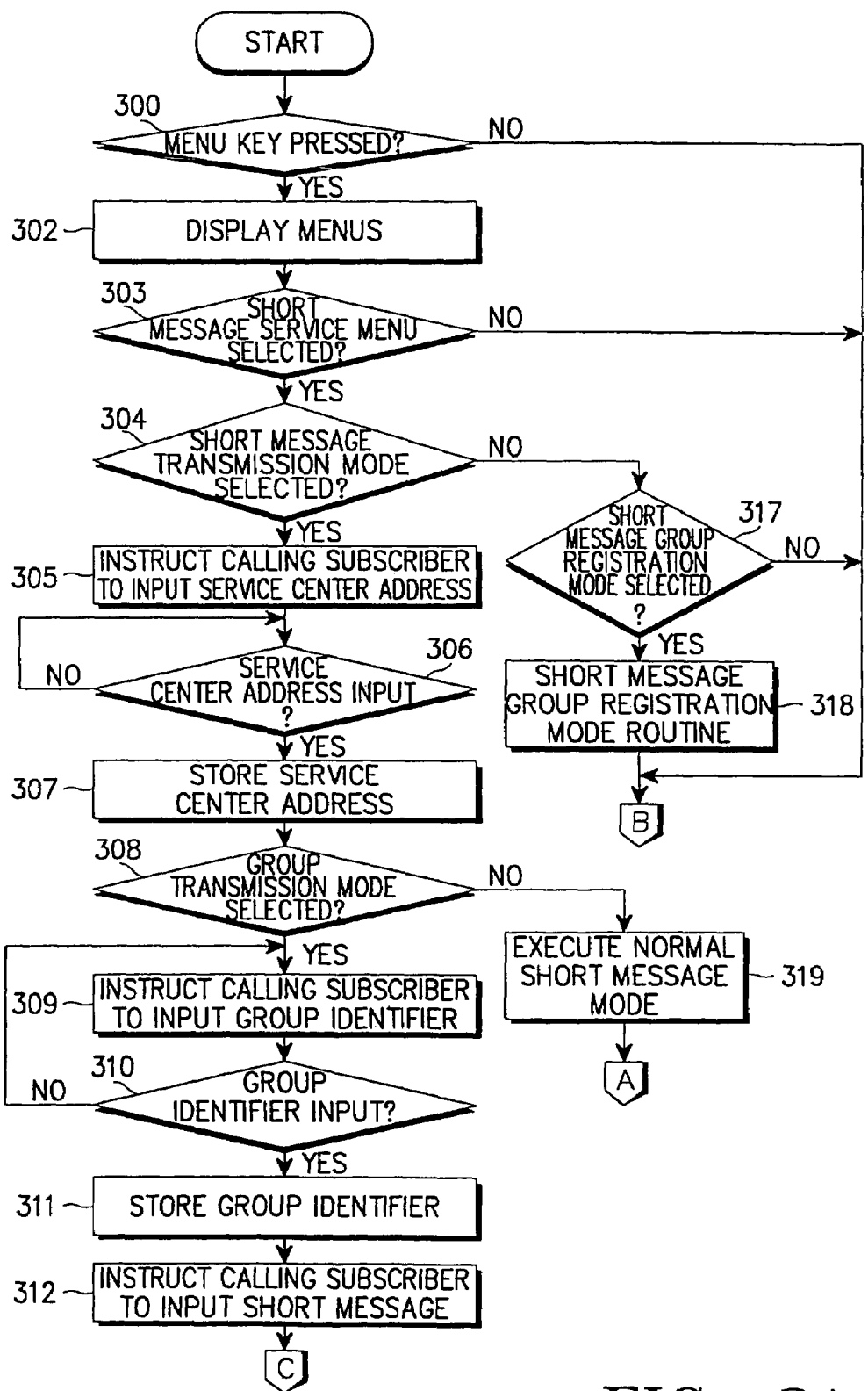
FIGS. 3A and 3B illustrate a flow diagram of a method for transmitting a short message by a GSM terminal in a GSM system according to one aspect of the present invention.
Figure 3B:
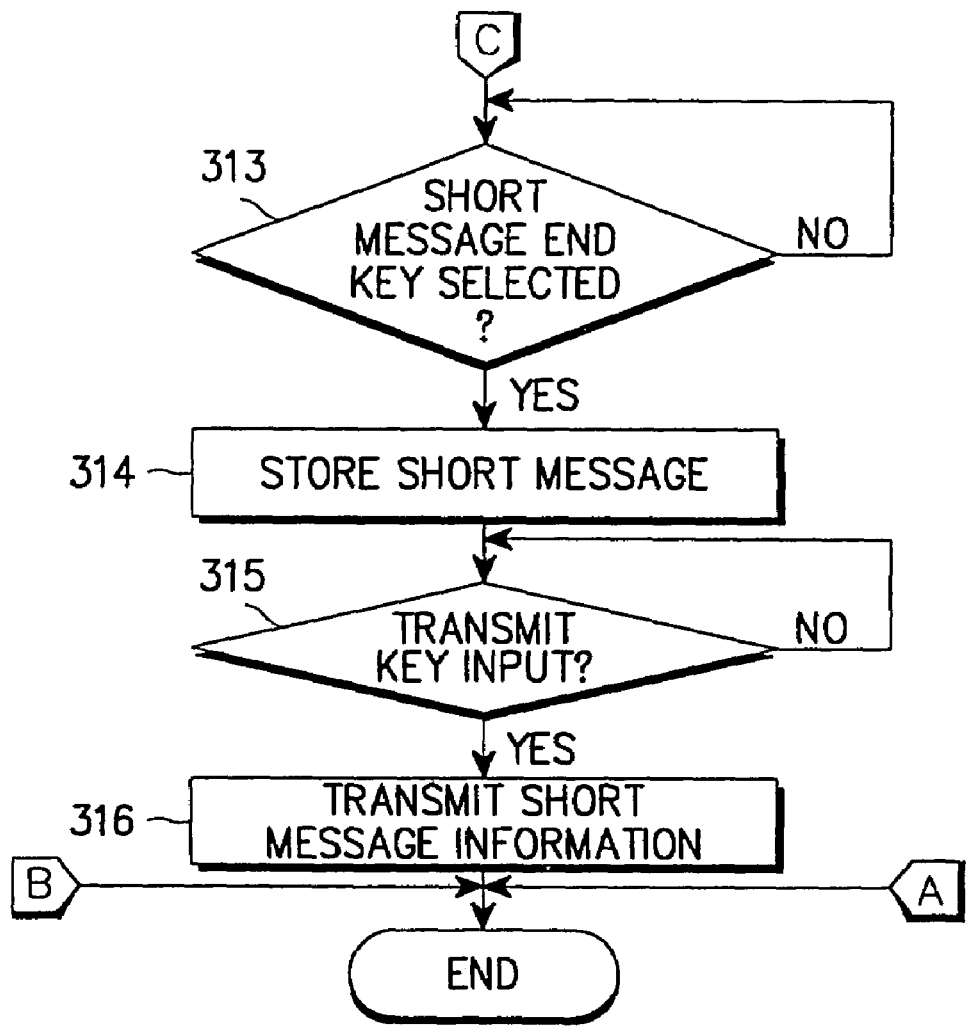

Referring now to FIGS. 3A and 3B, a flow diagram illustrates a method for transmitting a short message by a GSM terminal in a GSM system according to one aspect of the present invention. Initially, the controller 1 determines if a menu key on the key entry unit 3 is selected (step 300). If the menu key is selected (affirmative decision in step 300), the controller 1 causes the display unit 4 to display menus such as a short message service menu and a secret number change menu (step 302). Next, a determination is made as to whether the short message service menu is selected among the displayed menus (step 303). If the short message service menu is selected (affirmative decision at step 303), the controller 1 causes the display unit 4 to display sub-menus such as a short message transmission mode and a short message group registration mode. If the short message transmission mode is selected among the displayed sub-menus (affirmative decision at step 304), the controller 1 causes the display unit 4 to instruct the calling subscriber to input a service center address which is a short message service center number (step 305). On the other hand, if the short message transmission mode is not selected (negative decision in step 304), a determination is made as to whether the short message group registration mode is selected among the displayed sub-menus (step 317). If the short message group registration mode is selected (affirmative decision in step 317), the controller 1 performs a short message group registration mode routine (step 318) (which is explained in further detail below with reference to FIG. 4).

After the calling subscriber is instructed to input a service center address (step 305), a determination is made as to whether the short message service center address is input (step 306). If the short message service center address is input (affirmative decision at step 306), it is stored in the memory 2 (step 307). Next, the calling subscriber will select one of a group transmission mode and a normal mode, which are displayed on the display unit 4 under the control of the controller 1. If the group transmission mode is selected (affirmative result at step 308), the calling subscriber is instructed to input a group identifier to which the short message is transmitted (step 309). If the group transmission mode is not selected (negative result at step 308) (i.e., if the normal mode is selected at step 308), the controller 1 executes a normal short message mode (step 319) (as discussed above).

After the calling subscriber is instructed to input a group identifier (step 309), the controller 1 determines if the group identifier is input (step 310). If the group identifier is input (affirmative decision at step 310), it is stored in the memory 2 (step 311). The calling subscriber is then instructed to input a short message (step 312). A determination is then made as to whether a short message end key is selected (step 313, FIG. 3B). If the short message end key is selected (affirmative decision at step 313), the short message is stored in the memory 2 (step 314). The controller 1 then determines if a transmit key is selected (step 315). If the transmit key is selected (affirmative decision at step 315), the controller 1 transmits the stored short message service center address, group identifier and short message (i.e., short message information) with a normal burst format through the RF circuit 5 (step 316). In particular, the RF circuit 5 modulates the short message information into a radio signal under the control of the controller 1, and transmits the modulated radio signal through the antenna.

Figure 4:
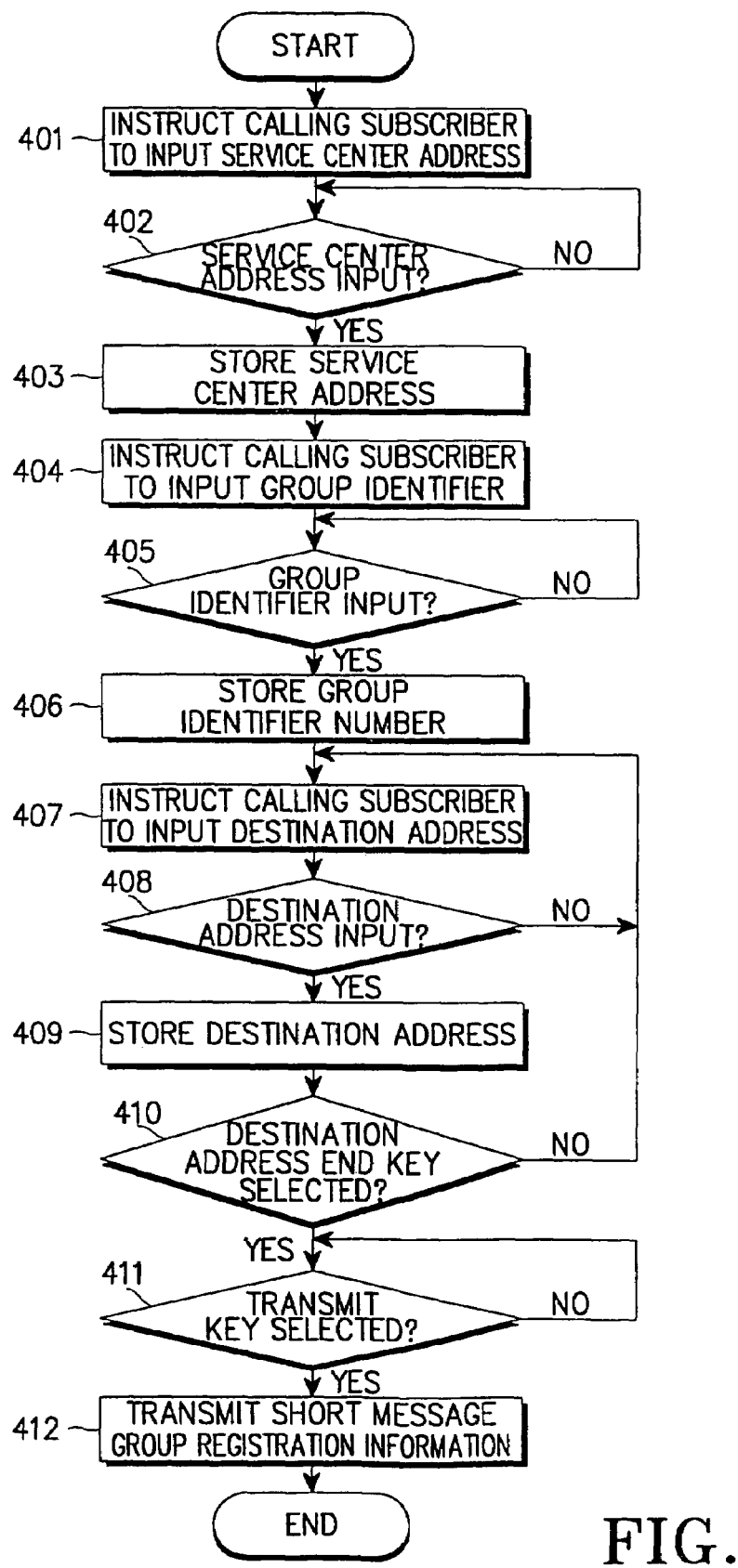
FIG. 4 is a flow diagram illustrating a short message group registration mode routine of FIG. 3A according to one aspect of the present invention.

Referring now to FIG. 4, a flow diagram illustrates the short message group registration mode routine (step 318 in FIG. 3A) in accordance with one aspect of the present invention. If the short message group registration mode is selected among the displayed sub-menus (affirmative decision at step 317 of FIG. 3A), the controller 1 enters the short message group registration mode routine. The calling subscriber is then instructed (via the controller 1) to input a short message service center address (step 401). A determination is made as to whether the service center address is input (step 402). If the service center address is input (affirmative decision at step 402), it is stored in the memory 2 (step 403). The calling subscriber is then instructed to input a group identifier (step 404). The controller 1 then determines if the group identifier is input (step 405). If the group identifier is input (affirmative decision at step 405), it is stored in the memory 2 (step 406). The calling subscriber is then instructed to input a destination address, i.e., a called subscriber number (step 407). A determination is then made as to whether the destination address is input (step 408). If the destination address is input (affirmative decision at step 408), it is stored in the memory 2 (step 409).

The controller 1 then determines if a destination address end key is selected (step 410). If it is not selected (negative decision at step 410), the calling subscriber is instructed to input another destination address (return to step 407). In this manner, the calling subscriber can input a plurality of destination addresses (i.e., repeating steps 407, 408, and 409), and a plurality of called subscribers are grouped. Once the destination address end key is selected (affirmative decision in step 410), a determination is made as to whether the transmit key is selected (step 411). If the transmit key is selected (affirmative decision in step 411), the controller 1 will transmit the short message group registration information with a burst format through the RF circuit 5 (step 412). The RF circuit 5 modulates the short message group registration information into a radio signal.

The radio signal (which is modulated with either the short message information (step 316, FIG. 3B) or the short message group registration information (step 412, FIG. 4)) is transmitted from the GSM terminal 10 to the BTS 114. The BTS 114 demodulates the radio signal into a short message signal. The short message signal is transmitted to the MSC 100 through the BSC 112. The MSC 100 transmits the short message signal to the subscriber authenticator 140. The subscriber authenticator 140 detects a GSM terminal number and retrieves GSM terminal numbers stored in the HLR 160 to determine whether the detected GSM terminal number is a registered number. If the GSM terminal 10 is authenticated as a registered terminal, the MSC 100 is switched to a service center address detector 130 to detect the service center address. The MSC 100 receives the detected service center address and is switched to the corresponding service center. Moreover, the MSC 100 matches the short message through the short message service gateway 170 and transmits the short message to the short message service center 180.

Figure 7:
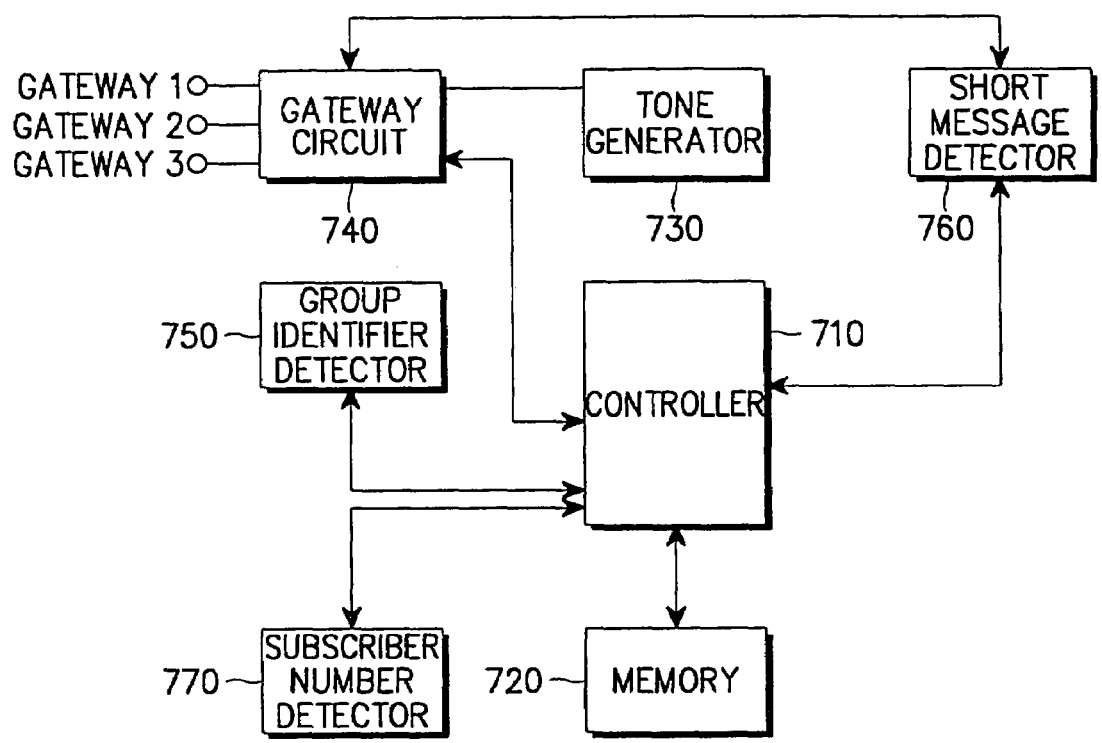
FIG. 7 is a block diagram of an embodiment of a short message service center.

Referring now to FIG. 7, a block diagram illustrates the short message service center. A gateway circuit 740 detects either the short message information or the short message group registration information from the short message signal received from gateways 1, 2, and 3, and provides an interface for input/output signals. A group identifier detector 750 detects a group identifier from the short message information or short message group registration information detected from the gateway circuit 740, and transmits the detected group identifier to a controller 710. A short message detector 760 detects a short message from the short message information or the short message group registration information. A subscriber number detector 770 detects called subscriber numbers corresponding to the group identifier. A tone generator 730 generates a tone signal and transmits the tone signal to the gateway circuit 740. A memory 720 stores program code for operating the short message service center and stores a short message for a prescribed time. The controller 710 controls the overall operation of the short message service center and causes the group identifier detector 750 to detect the group identifier. The controller 710 also causes the tone generator 730 to transmit the tone signal to a called subscriber number included in the detected group identifier.

Figure 5:
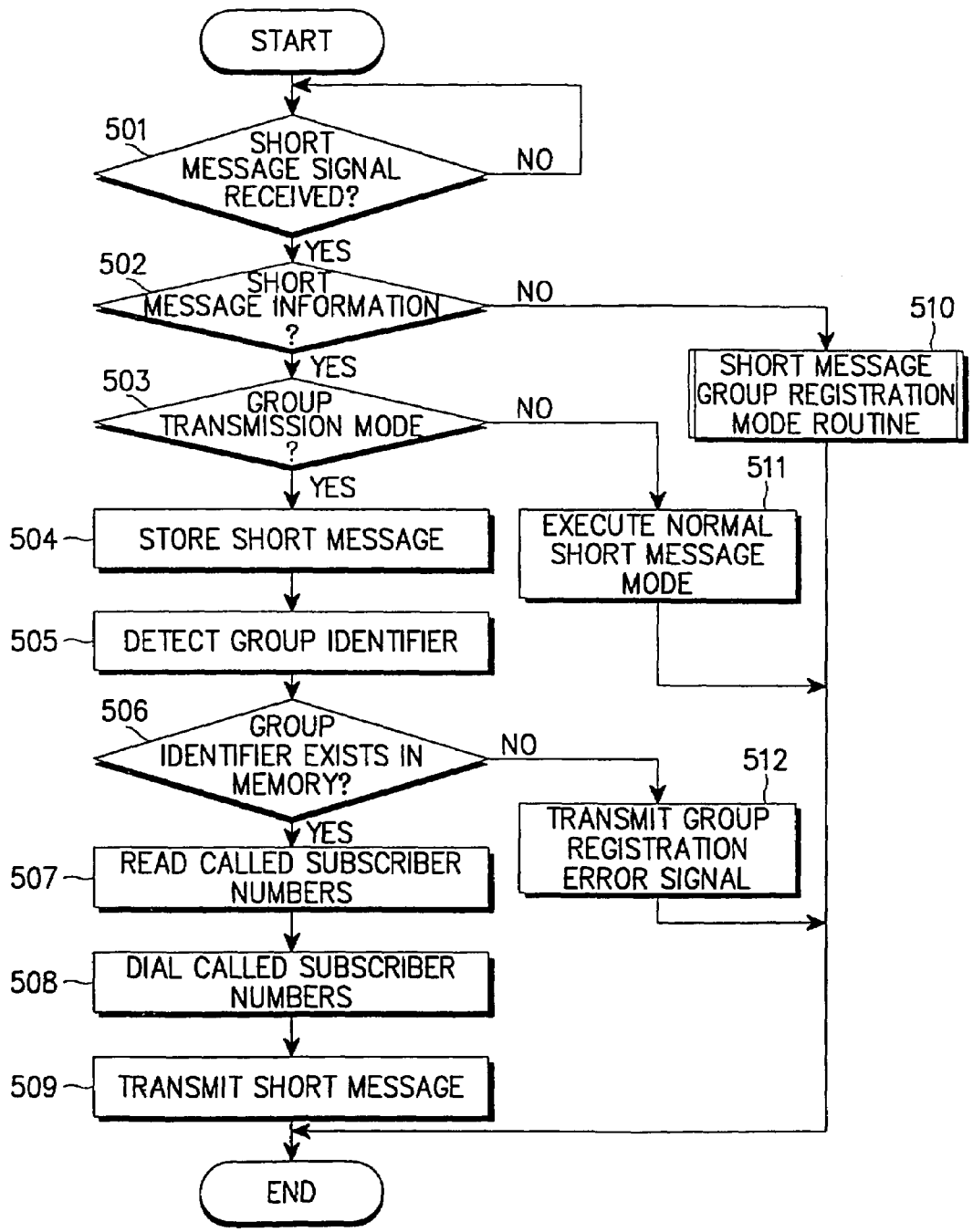
FIG. 5 is a flow diagram illustrating a method for transmitting a short message by a short message service center in a GSM system according to one aspect of the present invention.

A method of operation of the short message service center will now be discussed with reference to FIG. 7 and FIG. 5 which is a flow diagram that illustrates a short message transmitting procedure of the short message service center. The controller 710 of the short message service center (FIG. 7) determines whether a short message signal is received from the gateway circuit 740 (step 501). Upon receiving the short message signal (affirmative result in step 501), the controller 710 determines if the short message signal includes either short message information or short message group registration information (step 502). If the short message signal includes the short message information (affirmative result at step 502), a determination is made as to whether the short message information is a group transmission mode (step 503). On the other hand, if the short message signal includes the short message group registration information (negative decision in step 502), the controller 710 will execute a short message group registration mode routine (step 510) (as discussed in further detail below with reference to FIG. 6). If the short message information is a group transmission mode (affirmative decision at step 503), the controller 710 causes the short message detector 760 to detect the short message and the detected short message is stored in memory 720 (step 504). If the short message information is not a group transmission mode (negative decision in step 503), the controller 710 will execute a normal short message mode (step 511).

Once the short message is stored (step 504), the controller 1 causes the group identifier detector 750 to detect the group identifier from the short message information (step 505). A determination is then made as to whether the detected group identifier exists in the memory 720 (step 506). If the group identifier exists in memory 720 (affirmative decision at step 506), the controller 710 reads from memory 720 the called subscriber numbers of the corresponding group (step 507). However, if the detected group identifier does not exist in the memory 720 (negative result at step 506), the controller 710 transmits a group registration error signal to the GSM terminal (step 512).

Figure 1:
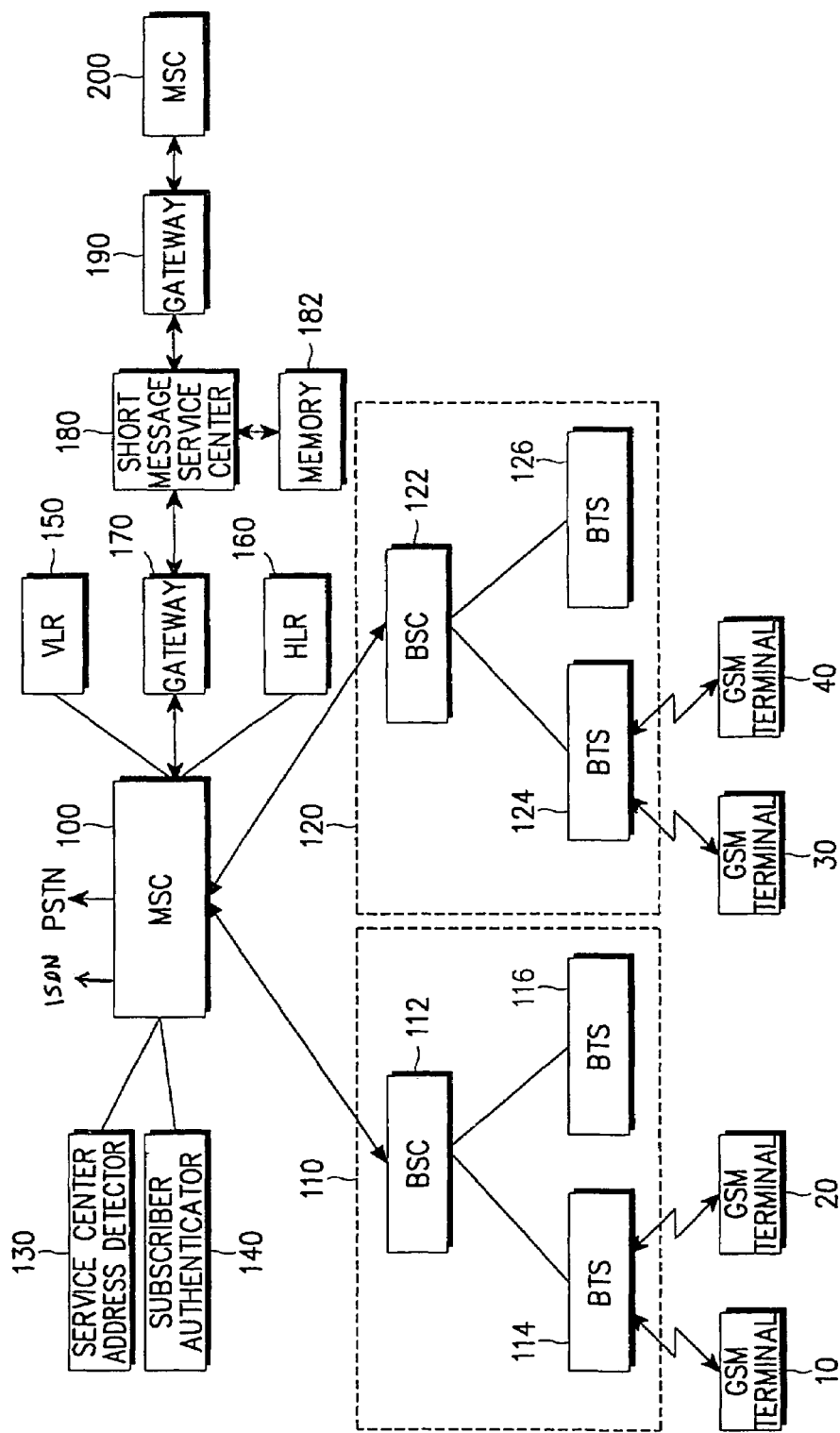
FIG. 1 is a block diagram of a GSM system in which the present method for transmitting short messages can be implemented.
Figure 2:
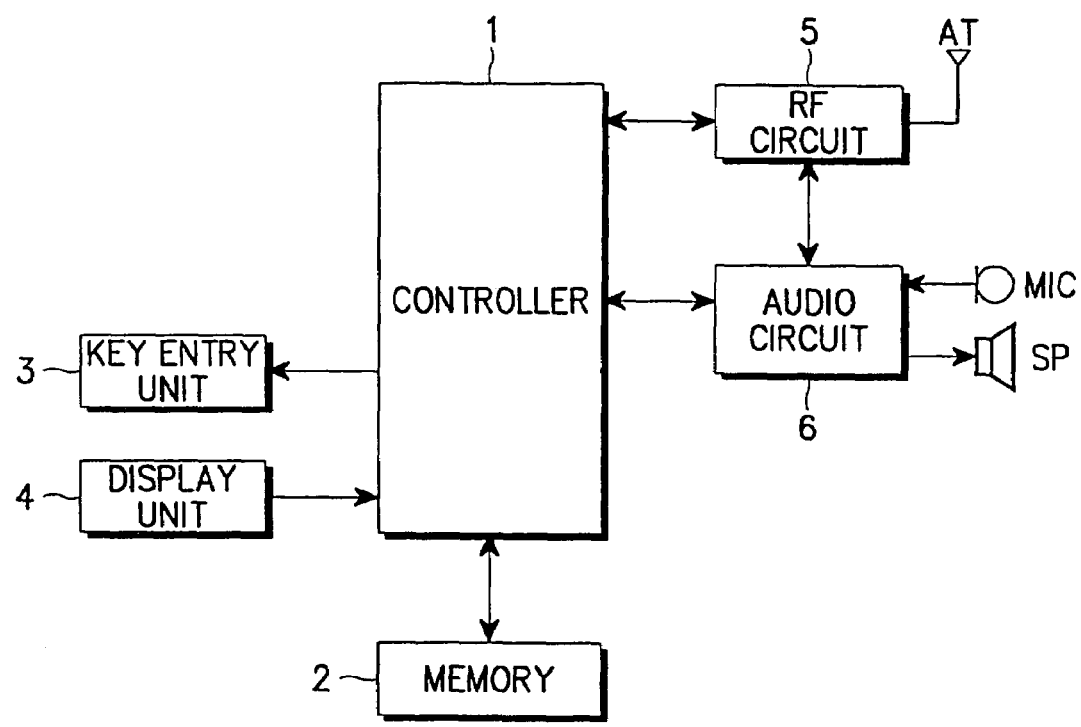
FIG. 2 is a block diagram of a GSM terminal in which the present method for transmitting short messages can be implemented.

After the called subscriber numbers are read from memory (step 507), the controller 510 causes the tone generator 730 to transmit DTMF signals corresponding to each of the called subscriber numbers (step 508). The short message is then transmitted to each of the called subscriber numbers via the gateway circuit 740 (step 509). For example, assuming that the GSM terminals 20, 30 and 40 (FIG. 1) have subscriber numbers that are associated with the group identifier, the short message will be transmitted to those terminals.

Figure 6:
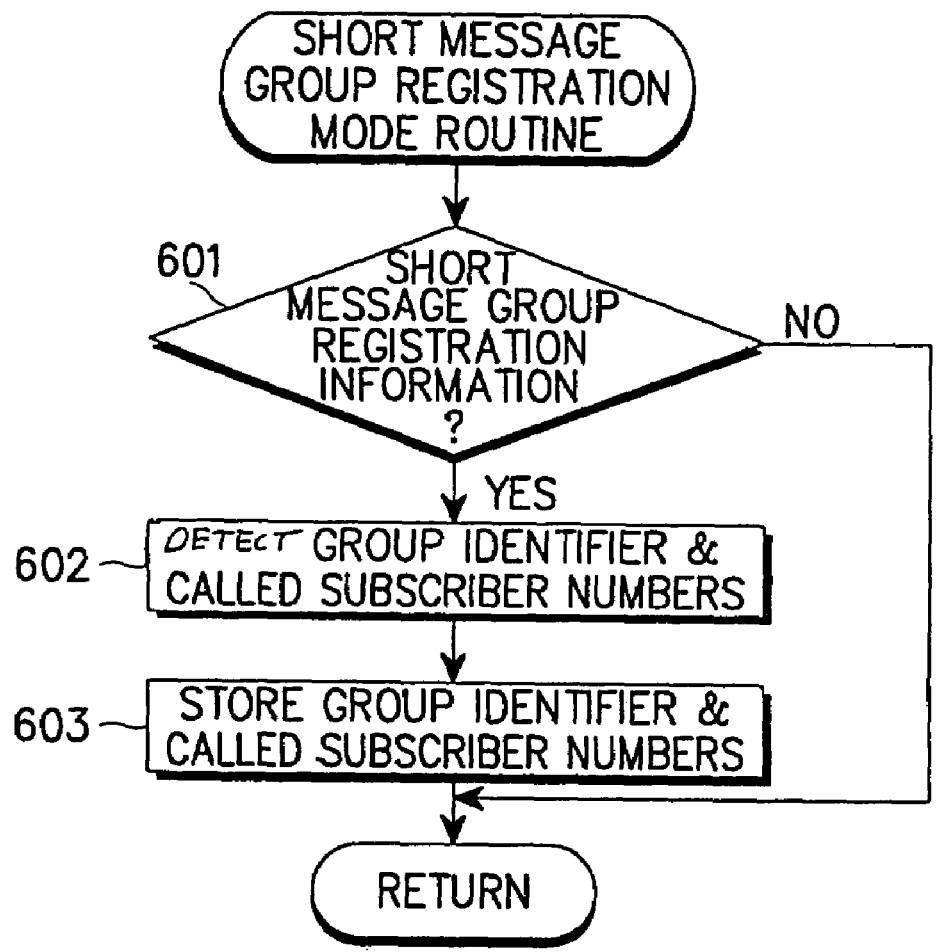
FIG. 6 is a flow diagram illustrating a short message group registration mode routine of FIG. 5 according to one aspect of the present invention.

Referring now to FIG. 6, a flow diagram illustrates a short message group registration mode routine (step 510 of FIG. 5) in accordance with one aspect of the present invention. If the short message signal received by the short message service center (FIG. 7) includes the short message group registration information, the controller 710 will execute a short message group registration mode routine (step 510, FIG. 5). In FIG. 6, initially, the controller 710 determines whether the short message signal received from the gateway circuit 740 includes the short message group registration information (step 601). If so (affirmative result at step 601), the controller 710 causes the group identifier detector 750 to detect the group identifier and causes the subscriber number detector 770 to detect the called subscriber numbers (step 602). The controller 710 then stores the called subscriber numbers in corresponding addresses that are associated with and/or assigned to the detected group identifier (step 603).

In summary, the short message can be simultaneously transmitted to a plurality of called subscribers without having to repeatedly transmit the same short message at successive times. Consequently, the time required for transmitting a short message to a plurality of called subscribers is significantly reduced by utilizing the methods herein.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for transmitting a short message to a plurality of subscribers in a mobile communication system, comprising the steps of:
    transmitting from a mobile communication terminal a short message registration signal including a short message service center number, a group identifier and at least one subscriber number, the group identifier being a separately defined field from device Identifiers (IDs) of the mobile communication terminal and the plurality of the subscribers;
    detecting, by a short message service center, said group identifier from said short message registration signal; and
    registering said transmitted subscriber numbers in said short message service center in accordance with said detected group identifier;
    wherein said step of transmitting said short message registration signal comprises the steps of:
    displaying a plurality of menus;
    selecting a short message service menu from said plurality of displayed menus;
    displaying a first set of sub-menus associated with said short message service menu, said first set of sub-menus including a short message transmission mode and a short message group registration mode;
    instructing a calling subscriber to input a short message service center number in response to selecting said short message group registration mode sub-menu;
    inputting said group identifier and said subscriber numbers; and
    transmitting said short message signal including said short message service center number, said group identifier and said subscriber numbers; and
    wherein said step of inputting said subscriber umbers includes the steps of:
    inputting a desired subscriber number;
    determining if a subscriber number end key is actuated; and
    instructing a caller to input another desired subscriber number if said subscriber number end key is not actuated.

2. The method of claim 1, wherein said step of transmitting said short message signal includes the steps of:
    determining if a transmit key is actuated when said subscriber number end key is actuated; and
    transmitting said short message signal upon actuation of said transmit key.

3. The method of claim 1, further comprising the step of storing said detected group identifier from said short message registration signal.

4. The method of claim 1, wherein said step of registering said transmitted subscriber numbers comprises the steps of:
    detecting said transmitted subscriber numbers;
    assigning a plurality of addresses corresponding to the detected group identifier; and
    storing each of said subscriber numbers in a corresponding one of said assigned addresses.

* * * * *